May 6, 1969  W. A. RUSH ET AL  3,442,094

THERMAL MASTIC

Filed Dec. 13, 1967

WITNESSES
Robert C. Baird
Daniel P. Cillo

INVENTORS
William A. Rush
and Harold L. Frankenstein.
BY Alex Mich Jr.
ATTORNEY

United States Patent Office 3,442,094
Patented May 6, 1969

3,442,094
THERMAL MASTIC
William A. Rush, Columbus, and Harold L. Frankenstein, Grove City, Ohio, assignors to Westinghouse Electric Corporation, Pittsburgh, Pa., a corporation of Pennsylvania
Filed Dec. 13, 1967, Ser. No. 690,276
Int. Cl. F28f 7/00; F25d 23/00
U.S. Cl. 62—516          5 Claims

ABSTRACT OF THE DISCLOSURE

A thermal mastic is used to provide good heat transfer between refrigerator tubing and refrigerator walls in refrigeration systems which does not degrade polyurethane insulating foam and is comprised of chlorinated paraffin, filler and wetting agent.

Background of the invention

This invention relates to a low cost thermal mastic that is compatible with polyurethane foam insulation in refrigeration systems.

It has been recognized that certain foam resins permanently containing in their cells vapors having a low coefficient of heat transmission provide superior insulating qualities. Such foams have been employed successfully to insulate refrigeration systems such as refrigerated railroad cars, trailer trucks, storage tanks, and certain types of refrigerators and freezers. In such applications it has been possible to apply the fabricated foam in thicknesses which are 50 percent or less than that normally required with other types of insulation to maintain the same desired levels of refrigeration. By employing polyurethane foam, therefore, much less space is required by the insulating material, and a substantial increase in storage capacity can be realized.

In refrigerators, freezers and other polyurethane foam insulated products the foam is generally in contact with evaporator tubing on the cooling compartment and condenser tubing on the outer shell. The tubing is partly held in place by a high thermal conductivity mastic disposed between the tubing and the walls. The thermal mastic is a very important component of the system and is applied to afford intimate contact and good heat transfer between the tubing and metal walls of the refrigeration system.

Most of the low cost thermal mastics used in the industry consist of a filler such as powdered calcium carbonate and/or aluminum silicate clay along with a vehicle which is usually a high viscosity petroleum product. Smaller amounts of wetting agent such as a glycol are added. A resin such as a polybutene may be added to increase adhesion. It has been found that thermal mastics prepared in this manner degrade the polyurethane foam insulation during the foaming process especially if the foam reactants or ingredients are injected into the freezer in the form of a froth. The prior thermal mastics caused cracks and collapse of the cell structure in the polyurethane foam. Testing has shown that the high viscosity petroleum vehicle causes most of the incompatibility. The result of such cracking in the polyurethane foam, of course, is to substantially reduce insulating efficiency and to make polyurethane foams less useful in refrigeration applications.

Summary

Accordingly, it is the object of this invention to disclose a new and improved means of providing good heat transfer between tubing and walls in refrigeration systems which will be compatible with polyurethane insulating foams and which will not degrade frothed polyurethane foams used in such system.

Briefly the present invention accomplishes the above cited objects by employing low viscosity chlorinated paraffins as a vehicle in the thermal mastic in combination with fillers and a wetting agent. Introducing this type formulation produces a thermal mastic of low cost that is compatible with polyurethane foam.

Brief description of the drawing

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Description of the preferred embodiments

Urethane foams are produced by the exothermic reaction of a polyisocyanate and a polyol in the presence of a catalyst, cell control agents and a foaming or blowing agent. The polyol determines whether the resulting foam will be rigid or flexible, brittle or non-brittle, and the extent of its permeability to gas and moisture. The polyols that may be used are polyesters, and more generally, polyethers. Urethanes made with polyesters offer high strength and high temperature resistance. However, polyesters have virtually been replaced by the polyethers which provide less costly foams with more desirable properties.

The isocyanates are the components which tie the polyols into a polymeric structure by the reaction of their terminal NCO groups with the hydroxyl groups of the polyol. Isocyanates are generally made by reaction of an amine, or an amine salt, with phosgene, in the presence of an inert liquid into which they can dissolve.

One of the most important properties of urethane foam insulations is their low thermal conductivity or K-factor. It is about 0.165 B.t.u./in./hr./ft.$^2$/° F., and can be as low as 0.11–0.13 if the fluorinated foaming agent is properly encapsulated. Preparation of such foams are described in U.S. Patent No. 3,072,582 and in the voluminous literature relating to the field.

The urethane foam producing reactants may be admixed and poured directly into a cavity or mold to allow foaming-in-place. The reactive liquid flows to the bottom of the mold and then foams to about thirty times its volume. Frothing is a variation of the pour-in-place method. The difference is that the urethane foam admixture is dispensed into the cavity in a partially reacted and expanded viscous state. The frothing can be achieved by using blowing agents in the basic mix that give a two step blowing agent action. The first blowing agent expands the mix into a froth and cools it, delaying the next expansion for a short time during which the froth may be introduced into the cavity. Frothing often allows narrow walled molds to be more easily and uniformly filled with less chance of leakage. Frothing also exerts less pressure on the cavity or mold because the partially expanded froth further expands only about another three times in volume.

Figure 1:
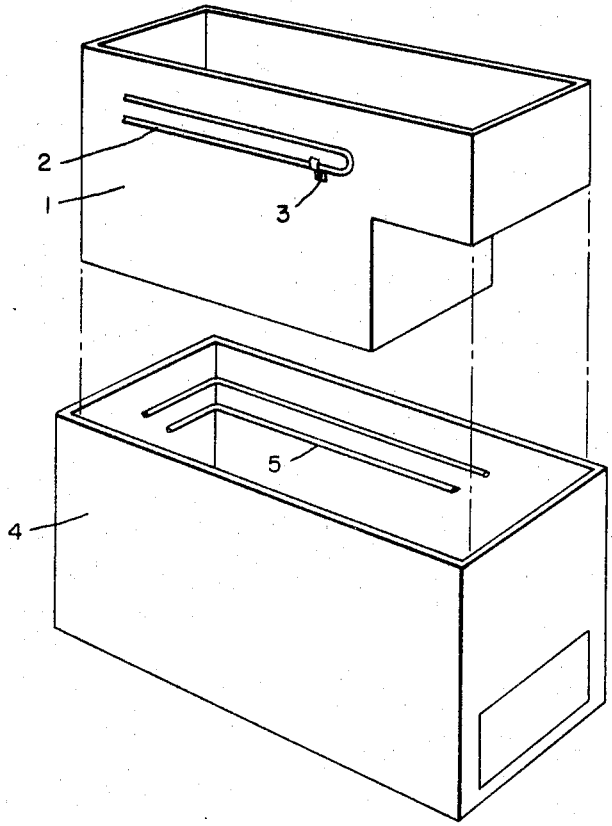
FIGURE 1 is a three dimensional exploded view of a freezer cabinet.

Referring now to FIGURE 1, an exploded view of a refrigeration system, in this case a freezer cabinet, is shown. The food liner or inner wall of the freezer 1 has evaporator tubing 2 attached by a series of clips 3 to the outer surface of the food liner. The food liner is inserted into the cabinet or outer shell 4. The condenser tubing 5 is attached to the inner surface of the outer shell.

Figure 2:
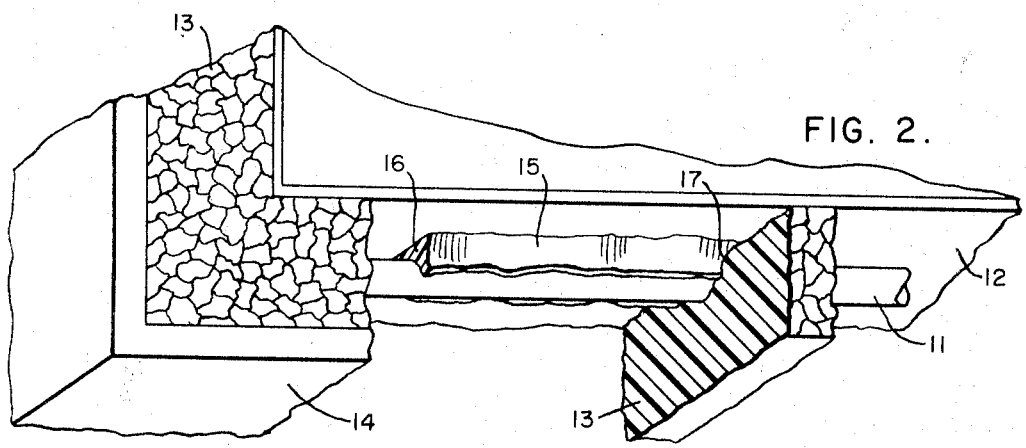
FIG. 2 is a three dimensional cross sectioned view of part of a refrigeration system exposing refrigeration tubing, thermal mastic and foam insulation.

FIGURE 2 shows a cutaway section of part of a refrigeration system. A refrigeration tube 11, in this illustration evaporator tubing, is held in place close to the inner refrigeration wall 12 surrounding the cooling compartment. The polyurethane foam insulation 13 fills the cavity or space between the inner wall and outer shell 14. The foam insulation has been sectioned to give a better view of the refrigeration tube 11 and the thermal mastic 15. A cut away section of the thermal mastic is shown at 16 and the contact of the thermal mastic with the polyurethane foam insulation is shown at 17.

EXAMPLE I

A pumpable mastic or paste was applied to the interior of a large metal container. This paste had good adhesive properties, a K-factor of .65 B.t.u./in./hr./ft.$^2$/° F. and a formulation of 32 weight percent chlorinated paraffin containing about 50% by weight chlorine and having a kinematic viscosity of about 2600 centistokes at room temperature (24° C.), 28 weight percent powdered aluminum silicate clay filler, 39 weight percent powdered calcium carbonate filler, and 1 weight percent oleic acid. The container was then filled with a polyether-urethane foam. This foam was prepared by admixing the following ingredients: 100 grams of polyether polyol having a hydroxyl number of 426 and a viscosity of 16000 centipoise (Pittsburgh Plate Glass Co. Selectrofoam 6416), 0.92 gram of a non-hydrolyzable organo silicone surfactant, 0.94 gram of dimethylethanol amine, 0.96 gram of a 33 percent solution of triethylenediamine in dipropylene glycol and 0.36 gram trichloromonofluoromethane. This admixture was fed into the top of a frothing head at a pressure of about 200 p.s.i. along with 0.88 gram toluene-diisocyanate having an amine equivalent of 105 and a viscosity of 100 centipose. Simultaneously, a 4% solution of dichlorodifluoromethane was injected to froth the above-described mixture. After the foam had cured it was cut out of the metal container. The cellular structure of foam was found not to have been degraded by the mastic or paste containing the chlorinated paraffin vehicle.

A thermal mastic or paste employing dioctyl phthalate in place of the chlorinated paraffin vehicle of the foregoing example was similarly tested and found to have essentially no deleterious effect on the cellular structure of the polyurethane foam insulation that was expanded while in contact with the mastic. The advantages of the thermal mastic compositions of this invention compared to the mastics employing paraffinic hydrocarbon vehicles are apparent upon a visual examination of the foam adjacent to the mastic.

The heretofore described chlorinated paraffin containing paste was then applied as a thermal mastic in six standard chest freezer cabinets. The paste was applied in a continuous bead on condenser and evaporator tubing before their placement in the freezer cabinets. The aforementioned frothed foam was then injected into the cavity between the walls and allowed to cure. Heat transfer between the refrigeration tubing and the freezer walls through the thermal mastic paste was shown to be excellent. After performance tests of several days operation, the cabinets were cut apart. The polyether-urethane foam showed no evidence of degradation from the thermal mastic. The results were thoroughly satisfactory. This formulation using the chlorinated paraffin solved the prior problem of cell collapse and cracking within the foam insulation adjacent to the thermal mastic.

It should be understood that the chlorinated paraffin vehicles suitable for use in this invention are prepared by chlorinating, under the influence of iron and sunlight or other similar catalyst systems, long chain paraffinic hydrocarbons. The long chain paraffinic hydrocarbons should have an average molecular weight such that the chlorinated product containing from about 20 to 50% by weight of chlorine will have a viscosity from about 2600 to 6000 centistokes at a temperature of 24° C. The vehicle should constitute from about 25 to 40 weight percent of the admixture. The finely divided or powdered inorganic filler should constitute from about 60 to 75 weight percent of the admixture. Within these specified ranges, the proportion of vehicle and filler may be varied to provide a composition having a consistency suitable for the particular method of mastic application that is selected. A small amount, in the order of one weight percent of the admixture, of a wetting agent such as oleic acid may be included in the formulation to facilitate the dispersion of the filler in the vehicle. Particularly good properties attend compositions wherein the mastic contains from about 25 to 32 weight percent of finely divided aluminum silicate clay and about 35 to 43 weight percent of finely divided calcium carbonate.

While there have been shown and described what are at present considered to be the preferred embodiments of this invention, modifications thereto will readily occur to those skilled in the art. It is not desired therefore that the invention be limited to the specific arrangements and embodiments shown and described and it is intended to cover in the appended claims all such modifications as fall within the true spirit and scope of the invention.

What is claimed is:

1. In a refrigeration system containing a cooling compartment, an inner wall surrounding the cooling compartment, evaporator tubing attached to the outer surface of the inner wall, an outer shell surrounding and spaced from the inner wall, condenser tubing attached to the inner surface of the outer shell, polyurethane foam insulation filling the space between the inner wall and outer shell, a thermal mastic having a high thermal conductivity disposed between the evaporator tubing and the inner wall and between the condenser tubing and the outer shell to provide good heat transfer between said tubing and the inner wall and outer shell and in contact with the polyurethane foam insulation, said thermal mastic comprising an admixture of a vehicle selected from the group consisting of chlorinated paraffin and dioctyl phthalate, and a particulated inorganic filler.

2. The system of claim 1 wherein the thermal mastic comprises about 25 to 40 weight percent chlorinated paraffin containing about 20 to 50% by weight chlorine and having a kinematic viscosity between about 2600 and 6000 centistokes at 24° C., and about 60 to 75 weight percent of finely divided inorganic filler.

3. The system of claim 1 wherein said inorganic filler comprises from about 25 to 32 weight percent aluminum silicate clay and about 35 to 43 weight percent calcium carbonate.

4. The system of claim 1 wherein the refrigeration system is a chest freezer and the foam insulation is a closed cell polyether-urethane foam, the cells containing a fluorinated hydrocarbon.

5. The system of claim 4 wherein said fluorinated hydrocarbon is a mixture of trichloromonofluoromethane and dichlorodifluoromethane.

References Cited

UNITED STATES PATENTS

| | | | |
|---|---|---|---|
| 2,386,889 | 10/1945 | Furry | 62—518 |
| 2,912,230 | 11/1959 | Rataiczak | 62—516 |
| 3,251,198 | 5/1966 | Cornelius | 62—516 |

LLOYD L. KING, *Primary Examiner.*

U.S. Cl. X.R.

165—136